United States Patent
Zampetti et al.

(10) Patent No.: US 8,385,212 B2
(45) Date of Patent: Feb. 26, 2013

(54) METHOD AND APPARATUS FOR FINDING LATENCY FLOOR IN PACKET NETWORKS

(75) Inventors: George P. Zampetti, Livermore, CA (US); Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 479 days.

(21) Appl. No.: 12/632,643

(22) Filed: Dec. 7, 2009

(65) Prior Publication Data

US 2011/0134766 A1 Jun. 9, 2011

(51) Int. Cl.
*H04L 12/26* (2006.01)

(52) U.S. Cl. .......................................... 370/241

(58) Field of Classification Search .............. 370/241, 370/248, 252, 503–519; 709/208–210, 248
See application file for complete search history.

(56) References Cited

U.S. PATENT DOCUMENTS

| | | | |
|---|---|---|---|
| 6,259,677 B1 * | 7/2001 | Jain | 370/252 |
| 6,937,603 B1 * | 8/2005 | Miao | 370/395.62 |
| 7,047,435 B2 * | 5/2006 | Liou et al. | 713/500 |
| 7,415,044 B2 * | 8/2008 | Kallstenius | 370/516 |
| 7,555,017 B2 * | 6/2009 | Shay et al. | 370/510 |
| 7,778,167 B2 * | 8/2010 | Bedrosian | 370/229 |
| 8,094,686 B2 * | 1/2012 | Bedrosian | 370/503 |
| 8,171,152 B2 * | 5/2012 | White et al. | 709/231 |
| 2003/0091047 A1 * | 5/2003 | Pate et al. | 370/392 |
| 2009/0276542 A1 * | 11/2009 | Aweya et al. | 709/248 |
| 2010/0118895 A1 * | 5/2010 | Radulescu | 370/503 |

OTHER PUBLICATIONS

IEEE Std. 1588-2008, "IEEE Standard for a Precision Clock Synchronization Protocol for Networked Measurement and Control Systems," 2008.
"Timing and Synchronization Aspects in Packet Networks," ITU-T Recommendation G.8261/Y.1361, Apr. 2008.

* cited by examiner

*Primary Examiner* — Dmitry H Levitan
(74) *Attorney, Agent, or Firm* — Patterson & Sheridan, L.L.P.

(57) ABSTRACT

A latency floor between two nodes of a packet-switched network is estimated using transit times of a group of packets traversing the two nodes. In particular, a periodically generated histogram of packet transit times is used to estimate the latency floor. In some packet-switched networks, the behavior of some network elements changes drastically when the network is congested. Because latency floor cannot be accurately estimated under such conditions, packet transit times collected during a congested state of the network are discarded.

20 Claims, 12 Drawing Sheets

METHOD AND APPARATUS FOR FINDING LATENCY FLOOR IN PACKET NETWORKS

BACKGROUND OF THE INVENTION

1. Field of the Invention

Embodiments of the present invention relate generally to time and frequency alignment systems operating over digital communications networks and, more specifically, to a method and apparatus for finding a latency floor in packet networks.

2. Description of the Related Art

One of the more important requirements of a digital communication network is to support real-time communications applications, which typically require time or frequency alignment, or a combination of both. For example, time alignment may be used by real-time instrumentation systems gathering data at specific time intervals or operating machinery according to specific timing. Frequency alignment is typically useful to time division multiplex (TDM) systems and media streaming systems, which require fixed video or audio sample rates across multiple clients.

One approach known in the art that provides both time and frequency alignment involves computing an aligned time signal based on global positioning system (GPS) satellite timing signals, which are each held in precise alignment with a global clock reference. Using GPS signals to achieve time or frequency alignment is generally quite expensive and requires a client system to be able to receive satellite time signals from GPS satellites. In general, a more cost effective approach to time alignment is to transmit timing alignment information via a protocol that is operable within a given communications network.

In conventional TDM networks a physical layer methods implement frequency alignment throughout the network, starting with a designated master clock system. The designated master clock system delivers (frequency) timing information via bit-timing (or symbol-timing) information associated with downstream physical communication links. In normal operation each system coupled to the master clock system replicates the master clock timing information to downstream systems by replicating physical layer timing from the master clock system to each downstream system. Each system within the TDM network receives (frequency) timing information and aligns local (frequency) timing to an upstream clock reference, thereby enabling every system within the TDM network to achieve frequency alignment.

While frequency alignment within conventional TDM networks is relatively straightforward, packet-switched networks, such as networks based on the popular Ethernet industry standards, present time and frequency alignment challenges because packet-switched networks are not conventionally designed to provide precise delivery time for data or precise timing at any lower protocol levels. A key difference is that the switching and multiplexing functions are not as deterministic as circuit switching and TDM, but have a statistical aspect as well. The statistical nature of switching and multiplexing adds a different notion of quality of service. Whereas error performance is always important, the notions of delay variation and available bandwidth now come into play. For a given packet flow, such as for a circuit-emulated service, a certain minimum "bit rate" may be specified along with a measure of how much more bandwidth can be made available, depending on the level of network congestion. A Service Level Agreement (SLA) between the network provider and an end-user would specify, among other items, the guaranteed (minimum) bit rate (or equivalent) as well as the upper limit to packet delay variation and other factors that could be in jeopardy in situations of network congestion.

Furthermore, packet-switched networks typically involve multiple nodes that may store and forward data packets, potentially introducing significant transit delay variation between any two points. To generally overcome certain time alignment challenges inherent in packet-switched networks, certain time alignment protocols based on the industry standard internet protocol (IP) have been developed and deployed. One IP-based time alignment protocol is known in the art as the Network Time Protocol (NTP). NTP is used for aligning time between a master time reference and one or more clients. Precision Time Protocol (PTP) is a second IP-based time alignment protocol for aligning one or more client devices to a master time reference. PTP is defined in detail within the IEEE 1588® standard.

Persons skilled in the art will understand that NTP, PTP, and any other time alignment protocol transmitted through a packet-switched network must account for transit delay variation within the network. In fact, overall time alignment accuracy is generally determined by the ability of a system implementing time alignment to account for transit delay variation between a time reference and a clock aligning to the time reference.

Lightly loaded packet-switched networks typically present relatively low transit delay variation, allowing IP-based alignment protocols such as NTP and PTP to easily achieve excellent accuracy relative to each protocol's specification. For example, in a lightly loaded gigabit Ethernet-based network, PTP can theoretically provide alignment of better than one hundred nanoseconds. However, conventional networks typically have a wide range of bandwidth loading conditions, which leads to large transit delay variations. This transit delay variation typically leads to degradation of time alignment accuracy. Furthermore, network elements comprising the packet-switched network may process sequential packets differently, depending on prevailing congestion conditions that result from increased bandwidth loading within the network. For example, a network element may forward all packets according to one delay profile until a congestion threshold is exceeded. Once the congestion threshold is exceeded, the network element may delay high priority packets, and drop low priority packets. If congestion on the network element drops below the congestion threshold, then the network element may stop delaying high priority packets and stop dropping low priority packets.

Frequency alignment between a frequency reference (master) and a frequency client (slave) may be disrupted by abrupt changes in transit delays resulting from one or more network elements switching form normal mode to congestion mode. Because conventional frequency alignment protocols presume transit delay does not change abruptly, a conventional client device commonly interprets a change in transit delay resulting from a network element changing between normal mode and congestion mode to be a local frequency error. The conventional client device may adjust for the local frequency error, even though no adjustment is actually needed. Similarly, time alignment between a time reference (master) and a time client (slave) may also be disrupted by abrupt changes in transit delays resulting from one or more network elements switching from normal mode to congestion mode.

Thus, several factors, including network congestion and network element policies for packet processing, may contribute to greater transit delay variation in a packet-switched network. Unfortunately, transit delay variation typically reduces accuracy and reliability of time and frequency alignment systems that conventionally depend on stability of transit delay within the packet-switched network.

SUMMARY OF THE INVENTION

One or more embodiments of the present invention provide a method and a system for finding a latency floor in packet-switched networks.

A method of finding a latency floor in packet-switched networks, according to an embodiment of the present invention, includes the steps of collecting transit times of multiple packets traversing two nodes of a packet-switched network, computing an average transit time of the fastest 5% of the packets, the computed average representing a first transit time, determining a second transit time as the fastest transit time of the slowest 5% of the packets, performing a curve fit using the first transit time and the second transit time, and estimating the latency floor based on the results of the curve fit.

A system for finding a latency floor in packet-switched networks, according to an embodiment of the present invention, includes a packet interface for receiving packets from a node of a packet-switched network, and a processor programmed to: (i) compute an average transit time of the fastest 5% of a group of the received packets, the computed average representing a first transit time, (ii) determine a second transit time as the fastest transit time of the slowest 5% of the group of the received packets, and (iii) estimate a latency floor based on the first and second transit times.

Additional embodiments of the present invention provide a method and a system for correcting clock frequencies using the estimated latency floor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
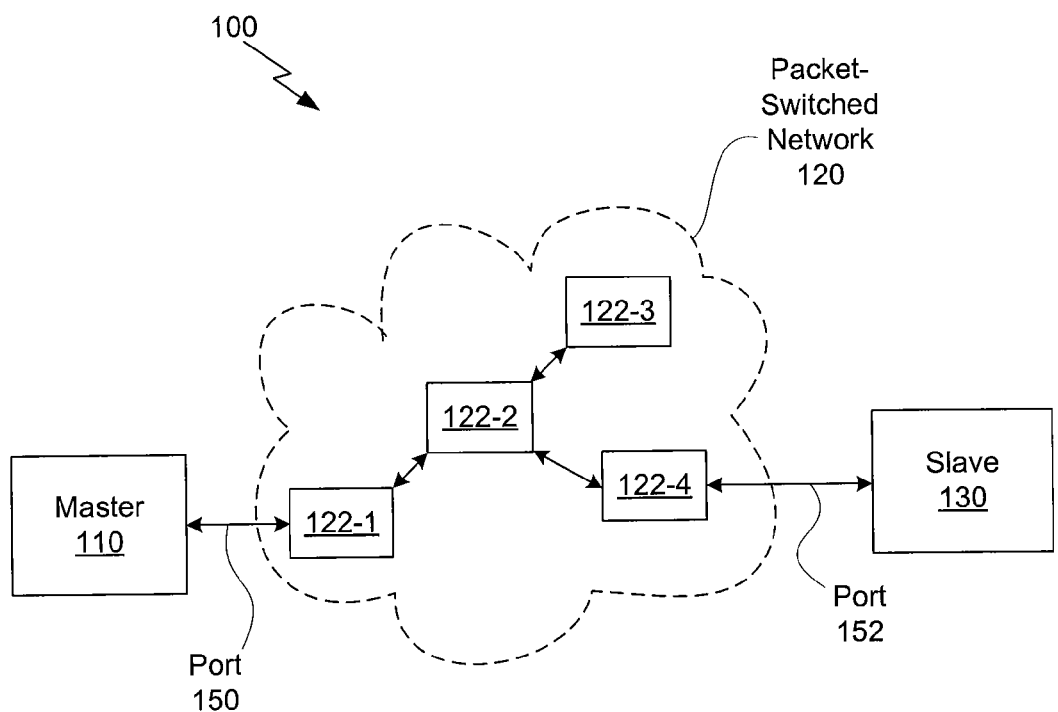
FIG. 1 illustrates a network system configured to implement one or more aspects of the present invention.

FIG. 1 illustrates a network system 100 configured to implement one or more aspects of the present invention. The network system 100 comprises a master clock 110, a packet-switched network 120, and a slave clock 130. In one configuration, the master clock 110 participates in an on-going two-way communication, exchanging time-alignment protocol IP packets with the slave clock 130 to align a real-time clock within the slave clock 130 to a real-time reference clock within the master clock 110. Aligning the real-time clock within the slave clock 130 involves aligning the frequency of a local oscillator within the slave clock 130 to the frequency of a reference oscillator within the master clock 110. Slight differences in frequency between the local oscillator and the reference oscillator are referred to as "tilt" and are generally inevitable in real systems. However, tilt can be reduced to be insignificant within the context of a given system. After the local oscillator is aligned in frequency with the reference oscillator, the two-way communication of time values between the master clock 110 and slave clock 130 may commence to align the slave clock 130 to the master clock 110.

In a second configuration, the master clock 110 engages in an on-going one-way communication with the slave clock 130. In this configuration, the master clock periodically transmits a time value and the slave clock 110 uses a plurality of sequential time values to align the local oscillator with the reference oscillator. Persons skilled in the art will recognize that various techniques for time alignment exist in the art and that time alignment requires two-way communication of a notion of local time between the master clock 130 and the slave clock 110.

The packet-switched network 120 is configured to forward IP packets between two or more attached devices, thereby enabling two-way communication between any two attached devices. Each network element 122 within the packet-switched network 120 is configured to forward the IP packets based on an IP address, an Ethernet destination address, any other technically feasible forwarding information associated with an IP packet.

IP packets transmitted by the master clock 110 and destined for the slave clock 130 traverse network elements 122-1, 122-2, and 122-4. Congestion within any network element 122-1, 122-2, 122-4 can impact delivery time of packets being delivered from the master clock 110 to the slave clock 130. Similarly, IP packets being delivered from the slave clock 130 to the master clock 110 may be subjected to transit delay variation and congestion. As discussed in greater detail below in FIG. 6, certain network elements 122 may respond to congestion by abruptly imposing additional transit delay on certain types of packets (such as high priority IP packets), and statistically dropping other types of packets (such as low priority IP packets).

Figure 2A:
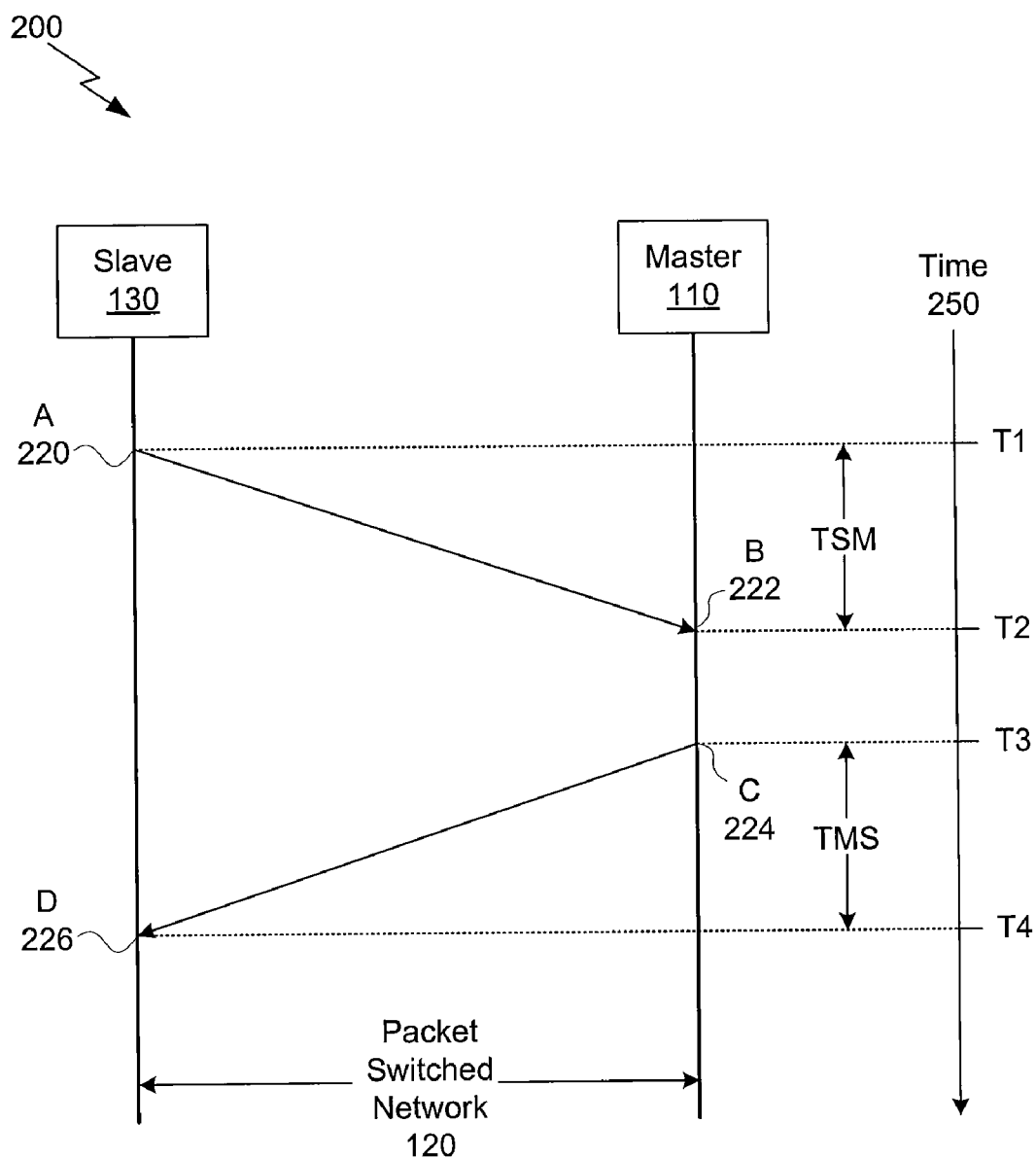
FIG. 2A illustrates a two-way time protocol interaction between a master clock and a slave clock communicating via a packet-switched network, according to one embodiment of the invention.

FIG. 2A illustrates a two-way time protocol interaction 200 between the master clock 110 and the slave clock 130 communicating via packet-switched network 120, according to one embodiment of the invention. The two-way time protocol interaction 200 should be repeated according to a certain measurement interval. Each event is shown with respect to time 250.

Event A 220 represents a departure of a first packet. The first packet is transmitted from the slave clock 130 to the master clock 110. The first packet includes a time stamp, based on measured departure time T1. The real-time clock within the slave clock 130 generates measured departure time T1. Event B 222 represents an arrival of the first packet with measured arrival time T2 at the master clock 110. The real-time reference clock within master clock 110 generates measured arrival time T2.

Event C 224 represents a departure of a second packet. The second packet is transmitted from the master clock 110 to the slave clock 130. The second packet includes a time stamp, based on measured departure time T3. The reference clock within the master clock 110 generates measured departure time T3. Event D 226 represents an arrival of the second packet with measured arrival time T4 at the slave clock 130. The real-time clock within the slave clock 130 generates measured arrival time T4.

The first packet traverses the packet-switched network 120 in slave-master transit delay time TSM. The second packet traverses the packet-switched network 120 in master-slave transit delay time TMS. TMS and TSM may generally represent respective transit delays within packet-switched network 120. Persons skilled in the art will recognize that transit delay times TMS and TSM may also be used to characterize other aspects of packet-switched network 120, such as loading or congestion. The second packet includes bit fields populated with measured reception time T2 and measured departure time T3 to convey T2 and T3 to the slave clock 130.

Figure 2B:
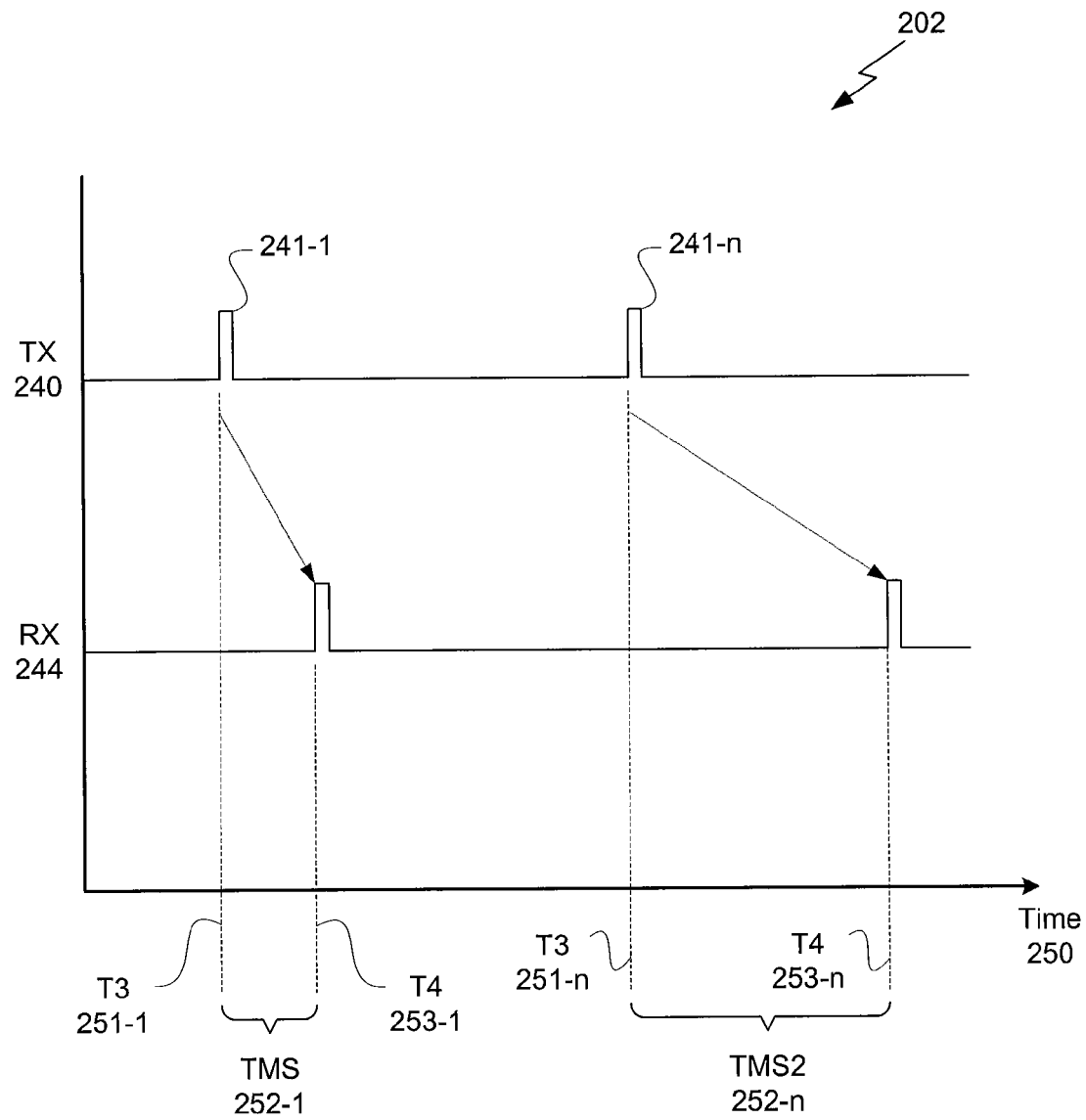
FIG. 2B illustrates a one-way timing protocol transmission from the master clock to the slave clock via the packet-switched network, according to one embodiment of the invention.

FIG. 2B illustrates a one-way timing protocol transmission 202 from the master clock 110 to the slave clock 130 via the packet-switched network 120, according to one embodiment of the invention. The master clock 110 periodically transmits packets 241, at times T3 251 from a transmit port TX 240 coupled to the packet switched network 120. The slave clock 130 receives the packets 241 at times T4 253 via receive port RX 244 coupled to the packet switched network 120. Each event is shown with respect to time 250. Each packet 241 includes a time stamp that reflects a departure time measured by the master clock 110. The one-way timing protocol transmission 202 is a simplification of FIG. 2A that enables frequency alignment of slave clock 130 to master clock 110.

Figure 2C:
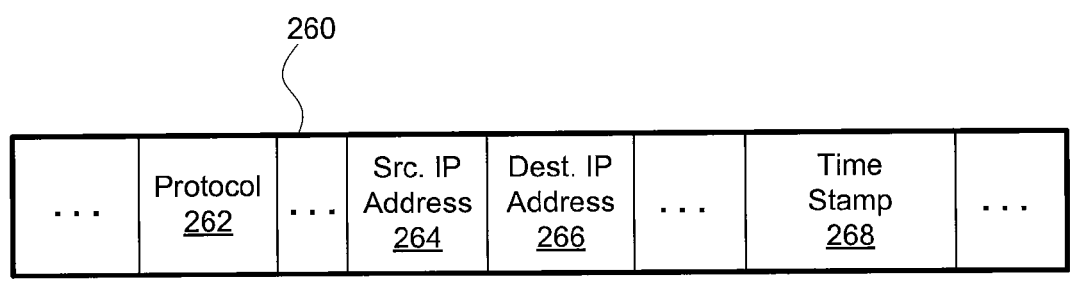
FIG. 2C illustrates a time protocol IP packet used to communicate between the master clock and the slave clock within the packet-switched network, according to one embodiment of the invention.

FIG. 2C illustrates a time protocol IP packet 260 used to communicate between the master clock 110 and the slave clock 130 within the packet-switched network 120, according to one embodiment of the invention. As shown, the time protocol IP packet 260 comprises standard IP fields, such a protocol field 262, a source IP address field 264, a destination IP address field 266, and a time stamp field 268. The protocol field 262 identifies how a recipient device should interpret the packet 260 with respect to a specific protocol. For example, the protocol field 262 may identify the packet 260 as a PTP packet, thereby uniquely defining other fields within the packet 260, such as a time stamp field 268, used to indicate a departure time for the packet. The source IP address field 264 identifies an IP address for the system that sent the IP packet 260, while the destination IP address 266 identifies an IP address to which the packet 260 should be delivered by the packet-switched network 120 of FIG. 1. Certain protocols may include one or more time stamp fields in addition to time stamp field 268. Certain other protocols may include control values in addition to, or instead of, time stamp field 268. For example, the master clock 110 may include a clock correction control value that the slave clock 130 can use to perform local time adjustments in order to align in with the master clock 110.

Figure 2D:
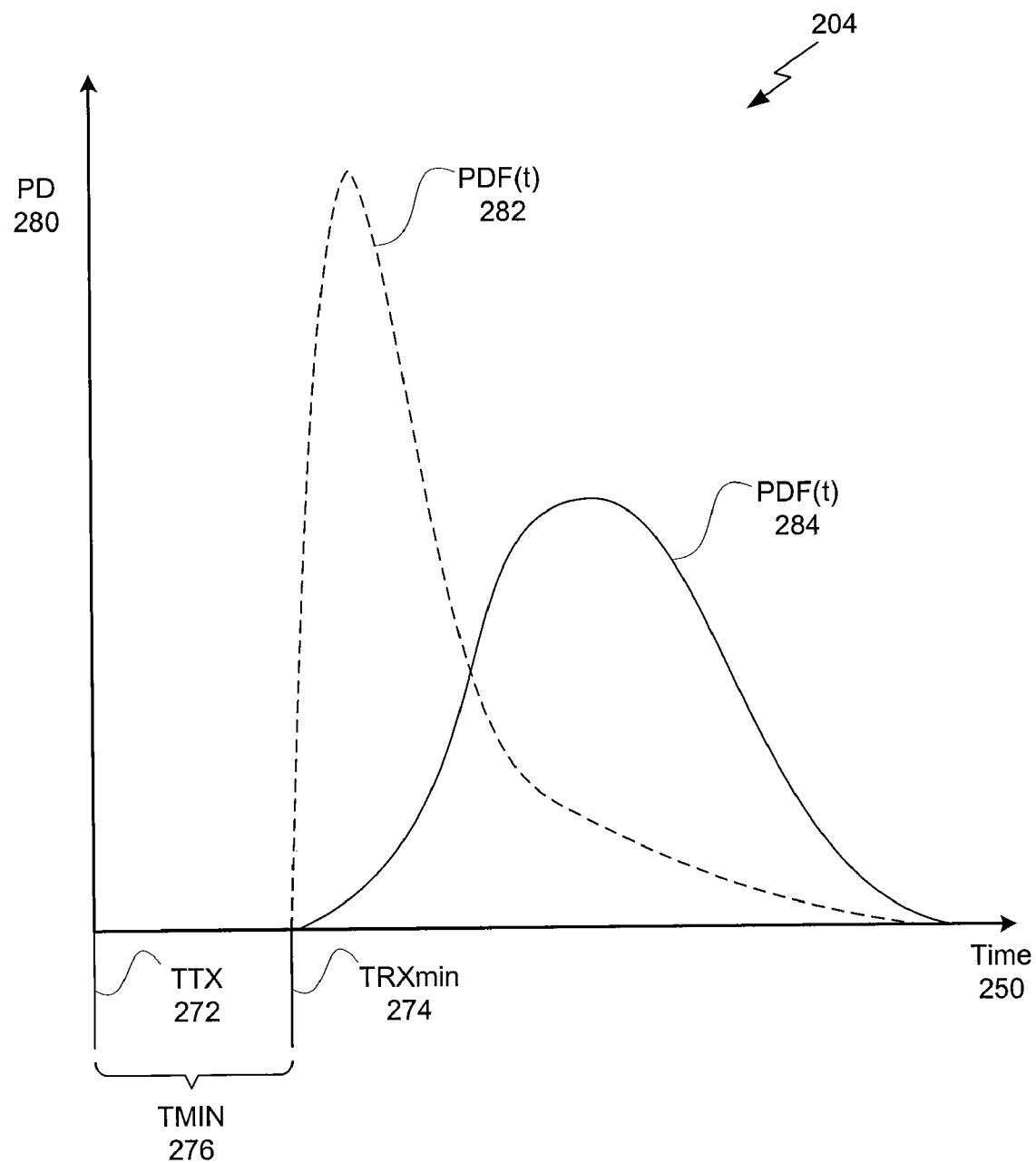
FIG. 2D is a probability density plot comparing a lightly loaded packet-switched network and a more heavily loaded packet-switched network.

FIG. 2D is a probability density plot 204 comparing a lightly loaded packet-switched network and a more heavily loaded packet-switched network. Probability density (PD) 280 is shown on a vertical axis, and time (transit latency through packet-switched network 120) is shown on a horizontal axis. A minimum transit time (TMIN) 276, hereinafter referred to as the latency floor or the transit delay floor, reflects a minimum possible delay associated with traversing the packet switched network 120 before arriving at a destination client device. TMIN 276 may be measured with respect to transmit time (TTX) 272 and receive time TRXmin 274. A packet that is injected into packet-switched network 120 at time TTX 272 may arrive at the client device no sooner than TRXmin 274. TMIN 276 is governed by speed of light signal propagation, physical signaling, protocol characteristics, and architectural characteristics of packet switched network 120. For example, if two nodes on packet-switched network 120 are physically separated by a speed of light transit time of one millisecond, then TMIN 276 is at least one millisecond. Furthermore, if each IP packet has a minimum transmission time of ten microseconds and passes through five network elements 122, each implementing a "store and forward" architecture, then TMIN 276 includes at least an additional fifty microseconds (five store and forward operations on a ten microsecond packet).

If packet-switched network 120 is completely quiescent (no offered bandwidth and no packets are in flight), then an IP packet offered to the network for forwarding should likely experience a transit delay that is very close to or essentially equal to TMIN 276. If IP packets are offered to the packet-switched network 120 at a rate that is sufficiently low so as to avoid congestion, then the IP packets should also be delivered in approximately TMIN 276.

As more packets are offered to the packet-switched network (more offered bandwidth), congestion within network elements 122 increases, resulting in an overall increase in packet transit times. Probability density function (PDF) 282 shows the probability density of transit time in a lightly loaded network. PDF 284 shows the probability density of transit time in a more heavily loaded network. PDF 282 indicates that a significant portion of IP packets transmitted through the packet-switched network 120 should be delivered with a transit delay close to TMIN 276, whereas PDF 284 indicates that few IP packets will be delivered in TMIN 276. With modest loading (modest congestion) within the packet-switched network 120, TMIN 276 should be measurable (visible), as described below. With sufficiently severe loading (congestion), TMIN 276 becomes increasingly difficult to measure.

When the transit delay floor is measurable, alignment protocols PTP and NTP can produce good time alignment within slave clock 130. However, if slave clock 130 continues to operate normally when transit delay variation is large and the transit delay floor is not measurable, then slave clock 130 may fall out of alignment. In one embodiment of the invention, when the slave clock 130 is not able to reliably measure the transit delay floor, then the slave clock 130 enters a "holdover" mode, wherein no local alignment adjustments are made until the transit delay floor is visible again.

Figure 3:
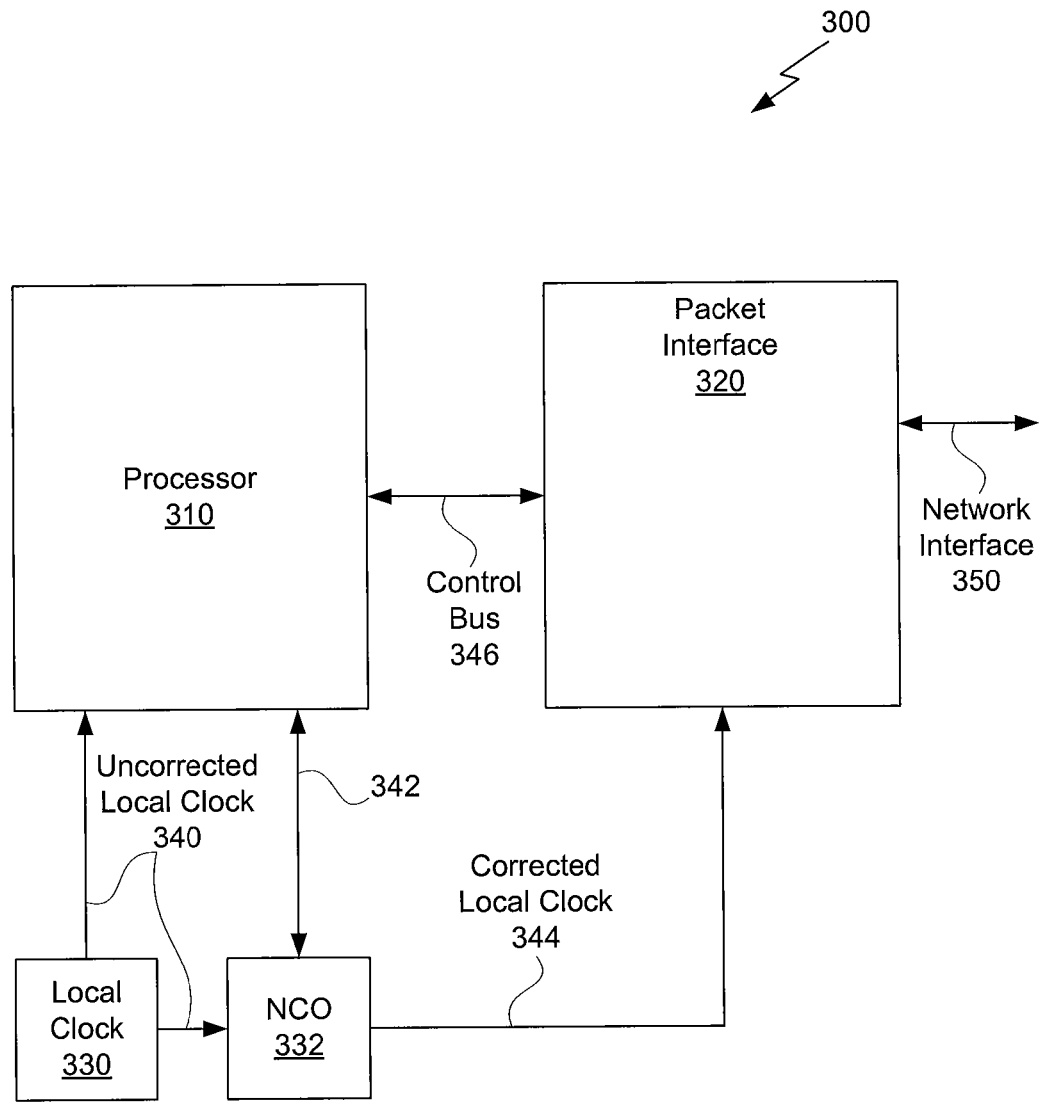
FIG. 3 illustrates a slave clock system configured to align a numerically controlled oscillator (NCO) in frequency with a master clock coupled to a network interface, according to one embodiment of the invention.

FIG. 3 illustrates a slave clock system 300 configured to align a numerically controlled oscillator (NCO) 332 in frequency with a master clock coupled to a network interface 350, according to one embodiment of the invention. The slave clock system 300 comprises a packet interface 320, a processor 310, a local clock 330, and the NCO 332. The local clock 330 comprises an oscillator configured to generate uncorrected local clock signal 340. The NCO 332 is configured to generate a corrected local clock 344, based on frequency adjustment parameters computed by the processor 310, and transmitted to the NCO 332 via NCO control bus 342. An estimate of the transit delay floor is used in computing the frequency adjustment parameters. In addition, any technically feasible technique may be used within NCO 332 to perform frequency adjustments to generate the corrected clock 344.

Figure 4:
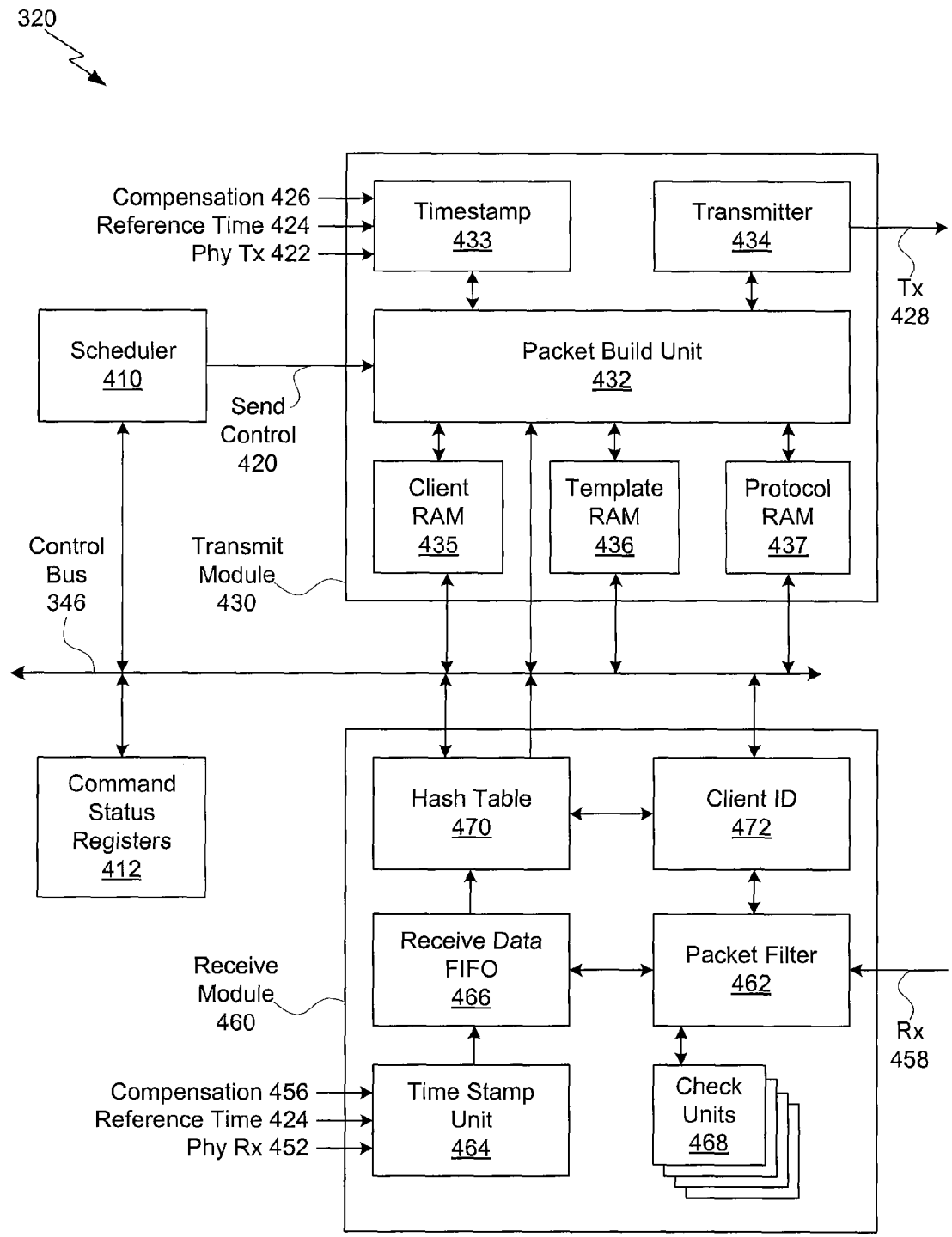
FIG. 4 is a more detailed view of the packet interface within the slave clock system, according to one embodiment of the invention.

The packet interface 320 is coupled to the processor 310 via control bus 346 and to the packet switched network 120 via network interface 350. The packet interface 320, discussed in greater detail below in FIG. 4, is configured to assemble and transmit IP packets via network interface 350. The packet interface 320 is also configured to receive IP packets via network interface 350 and parses the IP packets. In one embodiment network interface 350 comprises an Ethernet interface and performs conventional functions of an Ethernet network interface controller (NIC). The packet interface 320 includes a time stamp unit configured to compute a local time value based on the corrected local clock 344. When an IP packet is received via network interface 350, the packet interface 320 may associate the local time value from the time stamp unit with the IP packet. Similarly, the time stamp unit provides a local time value that is assembled into an IP packet transmitted by the packet interface 320.

The processor 310 is configured to align NCO 332 in frequency to a reference operating frequency from a master clock, such as master clock 110 of FIG. 1. Time adjustments are transmitted over control bus 346, while frequency adjustments are transmitted over NCO control bus 342. In one embodiment the processor 310 is also configured to align time stamp units in the packet interface 320 to a reference time associated with the master clock 110.

FIG. 4 is a more detailed view of the packet interface 320 within the slave clock system 300, according to one embodiment of the invention. The packet interface 320 comprises a transmit module 430, a receive module 460, a scheduler module 410, and a command and status registers module 412. The transmit module 430, receive module 460, scheduler module 410, and command and status registers module 412 are coupled to a control bus 346, configured to allow host processor 310 of FIG. 3 to communicate with each respective module.

The packet interface 320 generates a transmit data signal (Tx) 428 and a receive data signal (Rx) 458 based on a reference time signal 424, a physical transmission start signal (Phy Tx) 422, a transmit latency compensation signal (Tx Compensation) 426, a physical reception start signal (Phy Rx) 452, and a receive latency compensation signal (Rx Compensation) 456.

Figure 5A:
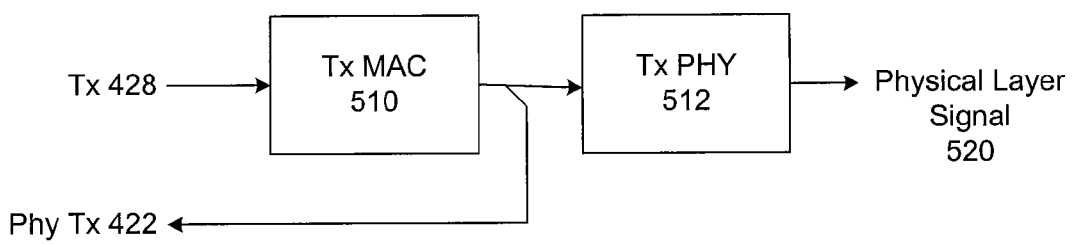
FIG. 5A illustrates an Ethernet physical layer transmitter unit configured to generate a physical layer signal that represents Ethernet frame data.

The transmit latency compensation signal 426 is a constant transmit latency value characterizing a delay through a transmitter media access control unit (shown in FIG. 5A). Tx 428 passes through this transmitter media access control unit before it is transmitted onto the physical layer. Phy Tx 422 is asserted at a transmission time offset relative to an actual start of transmission by the physical layer transmitter unit. The transmission time offset is characterized by the transmit latency compensation signal 426. The transmit latency compensation signal 426 may also include processing latency associated with the transmit module 430.

Figure 5B:
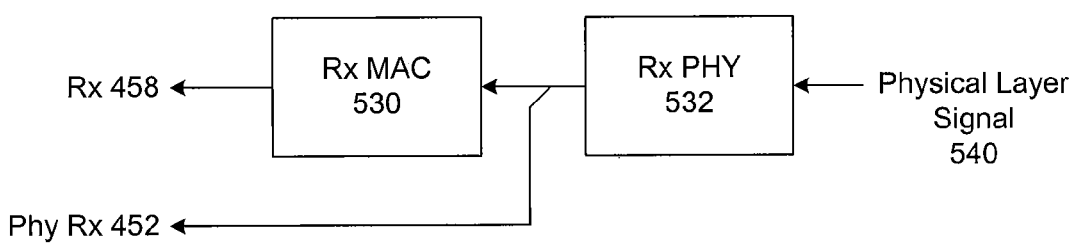
FIG. 5B illustrates an Ethernet physical layer receiver unit configured to receive and decode a physical layer signal.

The receive latency compensation signal 456 is a constant value characterizing a delay of Rx 458 through a receiver media access control unit (shown in FIG. 5B). Rx 458 is received at the receive module 460 from the physical layer by way of this receiver media access control unit. Phy Rx 452 is asserted at a receive time offset relative to an actual start of reception by the physical layer receiver unit. The receive time offset is characterized by the receive latency compensation signal 456. The receive latency compensation signal 456 may also include processing latency associated with the receive module 460.

The transmit latency compensation signal 426 and the receive latency compensation signal 456 may be determined from prior measurements of the delay through the transmitter media access control unit and the receiver media access control unit, respectively. In some embodiments, the delay from a prior packet may be sampled and applied as the time offset for a current packet.

The transmit module 430 is configured to generate an IP packet and transmit the IP packet as an Ethernet frame via Tx 428 in response to a generate command sent via send control 420 requesting that the transmit module 430 generate and transmit the IP packet. The transmit module 430 comprises a packet build unit 432, a client random access memory (RAM) 435, a packet template RAM 436, a protocol RAM 437, a time stamp unit 433, and a transmitter unit 434. In one embodiment, the packet build unit 432 is implemented as a field programmable gate array (FPGA) and the time stamp unit 433 is implemented as an FPGA. In alternative embodiments, the packet build unit 432 and the time stamp unit 433 may be implemented as other types of hardware devices including application specific integrated circuits.

The packet build unit 432 performs a set of operations to build a complete protocol packet and prepare the packet for transmission via the transmitter 434. Packets are built based on a template system, where a major portion of a given packet payload is defined in a static template. When a given packet is built, updates are applied to data fields within the template to generate a complete and correct packet. In one embodiment, there are two types of packet updates: stream-based updates and protocol based updates. For stream-based updates, an identifier for each updated field and data associated with each updated field are specified by software executing on the host processor on a stream-by-stream basis. For protocol-based updates, an identifier for each updated field and data associated with each updated field are specified for each particular type of message. For protocol-based updates, each update is applied to all packets of a given type. Updates may also include client or session related information, such as client IP address, VLAN address, and packet sequence number. During the packet build process the packet interface 320 is responsible for calculating and updating any required checksums. In one embodiment the packet build unit 432 performs checksum computations for packets built by the packet interface 320.

Data field updates can be applied on a per packet-stream (session) basis when a packet is being built. The packet-stream update mechanism for generating packets should update one or more fields in a packet that vary on a per stream basis. One example of a data field that needs to be updated on a per packet-stream basis is the destination MAC address in an Ethernet header. Similarly, the destination IP address in an IP header of a packet needs to be updated to reflect a client (destination) IP address for a packet being generated. The packet-stream update mechanism can be used to update any field in the packet. For efficient memory usage, certain update information may be shared over multiple streams, whereas data pertaining to a specific stream should include one instance of the stream-specific data.

The client RAM 435 is configured to store client related information, such as client IP address, VLAN address, and sequence number. The template RAM 436 is configured to store a definition of a basic packet structure to be generated and includes data fields that are populated with specific client and protocol information during packet generation. The protocol RAM 437 is configured to store information related to a protocol structure, such as where specific data fields are placed within a generated packet. In one embodiment client RAM 435, template RAM 436, and protocol RAM 437 are implemented as FPGA memory block RAMs.

In the embodiment of the present invention described herein, the template RAM 436 and protocol RAM 437 are organized as two pages, and one of the two pages may be designated as active, making the other page inactive. The active page is used by the packet interface 320 to perform packet generation processes. The inactive page may be accessed by the host processor to configure a new template. The inactive page may be designated the active page by the host processor at any time, however, the new designation will only take place at a safe time, such as when the packet build unit 432 is idle.

The time stamp unit 433 receives reference time 424 and the transmit latency compensation signal 426 and generates a compensated transmit time stamp, which is transmitted to the packet build unit 432. The compensated transmit time stamp is generated by adding the reference time 424 to the transmit latency compensation signal 426. The compensated transmit time stamp is the last update performed during packet generation.

The transmitter unit 434 receives packet information from the packet build unit 432 and transmits the packet information as Tx 428, which is supplied to an Ethernet media access control (MAC) unit, shown in FIG. 5A. The transmitter unit 434 is configured to perform any data and transfer rate translation necessary to generate Tx 428.

The receive module 460 is configured to receive an IP packet encoded as an Ethernet frame via Rx 458 and filter the IP packet according to a set of acceptance rules. If an IP packet passes the acceptance rules, then certain data from the IP packet is made available to the control bus 346.

The receive module 460 comprises a packet filter 462, a time stamp unit 464, a receive data first-in first-out (FIFO) buffer 466, check units 468, a hash table unit 470, and a client identification (ID) unit 472. The receive module 460 is configured to receive an incoming packet via Rx 458 and to process the packet according to programmable settings. In an alternative embodiment, the receive data FIFO 466 may be configured as a dual-port RAM. Also, the time stamp unit 464 is implemented in one embodiment as an FPGA. In alternative embodiments, the time stamp unit 464 may be implemented as other types of hardware devices including application specific integrated circuits.

The packet filter 462 is configured to identify incoming packets that match one of a plurality of programmable patterns. For packets that match one of the plurality of programmable patterns, the receive module 460 responds according to a programmable set of rules. One programmable response is to forward the packet to software executing on the host processor. Another response is to drop (discard) the packet. Yet another response is to generate an automatic reply to a respective client via the transmit module 430. The packet filter 462 is coupled to a set of check units 468 that are each configured to recognize a particular packet type using a set of programmable rule sets. The check units 468 and any associated rule sets may each be configured by software executing on the host processor. Any technically feasible technique may be used by the check units 468 to recognize packets.

When a packet is recognized as a packet that should be handled by the packet interface 320, certain data fields within the packet are extracted and pushed into the receive data FIFO 466, along with a corresponding compensated receive time stamp. The receive data FIFO 466 stores the extracted packet data and presents the extracted packet data to a hash table unit 470, which is configured to identify long patterns and generate shorter index values using any technically feasible techniques. Persons skilled in the art will recognize that hashing techniques may be used to generate a relatively short index value from a longer data string. For example, an IPv4 address may comprise a data string of thirty-two bits of address information that may be hashed into a twelve-bit index value that concisely identifies one of up to 2048 different client devices (via their IP address) communicating with the packet interface 320. Similarly, an IPv6 address may comprise a data string of 128 address bits that may be hashed to an arbitrary length index value. In one embodiment, the hash table unit 470 hashes an IPv4 IP address and related session information into a twelve bit value to identify up to 2048 different sessions from up to 2048 different IP addresses.

The time stamp unit 464 receives reference time 424 and the receive latency compensation signal 456 and generates the compensated receive time stamp, which is transmitted to the receive data FIFO 466. The compensated receive time stamp is generated by adding the reference time 424 to the receive latency compensation signal 456. The compensated receive time stamp is pushed into the receive data FIFO 466 along with related packet information for packets that are identified by the packet filter 462 as needing to be processed by the packet interface 320.

The client identification unit (ID) 472 receives an index value corresponding to a packet that was identified by the packet filter 462 for processing by the packet interface 320. The client ID 472 uses the index value to retrieve certain client and session state information used to generate a response. For example, the index value may be used to retrieve a packet sequence number, a protocol type, and so forth, which are necessary to properly respond. In one embodiment, the receive module 460 requests that the scheduler module 410 generate a response when appropriate within the context of a particular protocol. The request may be generated via the host processor or directly from the receive module 460 interacting with the scheduler module 410.

The scheduler module 410 is configured to trigger packet generation by the transmit module 430 according to a programmable set of rules. The scheduler module 410 triggers the transmit module 430 to generate and transmit packets at programmed rates to specific streams in timing applications and to deliver probe packets at designated intervals for probe applications. The scheduler module 410 uses the notion of events for purposes of scheduling, an event being the delivery of a packet for a particular stream. The number of scheduled events that can be supported is a function of hardware complexity. Supporting up to 2048 scheduled events is quite straightforward with current technological constraints. Each scheduled event is defined by data stored in an event entry within a control memory, disposed within the packet interface 320. In one embodiment, the control memory resides within the scheduler module 410. In an alternative embodiment, the control memory resides within the command and status registers module 412.

The intervals of transmission are programmable. In keeping with most applications that may require this feature, a typical design will support intervals of transmission based on powers of two with a range of values between $2^{-10}$ to $2^7$ seconds, or $\frac{1}{1024}$ to 128 seconds.

Each event has a programmable interval. Also, each event is programmed with pointers to information stored within the packet interface 320 regarding the packet content and the type of packet to send. The packet build unit 432 builds and transmits the packet when it is scheduled. Packet generation and transmission may also be scheduled according to a dithering process. When enabled, dithering will vary the transmit intervals of all active streams (packets associated with a given IP session), except a certain stream programmed in a specified entry (e.g., event entry 2048 of 2048 possible entries) of the control memory. A transmit window of approximately 800 microseconds may be used for scheduling dithered transmission of packets within a 976 microsecond (1024 Hz) scheduling interval. Although the time between successive transmissions of a specific stream will be varied, the average rate will be executed within each scheduling interval exactly as programmed. Extensions of the dithering process allow the launching of packets in a burst mode and in modes that have multiple packet transmissions, unequally spaced in time, but following an overall periodic behavior. This transmission pattern is often called "N packets in M seconds" and is useful to excite certain modes of behavior in packet networks.

The command and status registers module 412 are configured to store certain configuration information for controlling the operation of the packet interface 320 and modules therein. For example, the configuration information for the scheduler module 410 may be stored within the command and status registers module 412. Additionally, a selection bit can be stored within the command and status registers module 412 for controlling which pages of memory within the template RAM 436 and protocol RAM 437 are active.

FIG. 5A illustrates an Ethernet physical layer transmitter unit (Tx PHY) 512 configured to generate a physical layer signal 520 that represents Ethernet frame data Tx 428. A transmitter media access control unit (Tx MAC) 510 processes Tx 428 and sends processed Tx 428 data to Tx PHY 512 for transmission via physical layer signal 520. The Tx MAC 510 manages transmission of the Ethernet frames via the Tx PHY 512. The physical layer signal 520 represents Ethernet frames as sequential bit patterns in either an electrical or optical media. A preamble pattern marks the start of each transmitted Ethernet frame. At the start of the preamble pattern, Phy Tx 422 is asserted, alerting the time stamp unit 433 of FIG. 4 that an outbound Ethernet frame is departing. The latency from when a frame actually starts to when Phy Tx 422 is asserted may be large compared to a measured time resolution, however latency should be consistent within the Tx PHY 512. In one embodiment, Phy Tx 422 is sampled by the time stamp unit 433 of FIG. 4 with a time resolution of 4 nanoseconds. In an alternative embodiment, Phys Tx 422 is sampled by the time stamp unit 433 with a time resolution of 8 nanoseconds.

FIG. 5B illustrates an Ethernet physical layer receiver unit (Rx PHY) 532 configured to receive and decode a physical layer signal 540, according to one embodiment of the invention. The Rx PHY 532 transmits the decoded physical layer signal to a receiver media access control unit (Rx MAC) 530 for processing. The physical layer signal 540 represents Ethernet frames as sequential bit patterns in either an electrical or optical media. The beginning of each Ethernet frame is marked by a preamble pattern. When the preamble pattern arrives at the Rx PHY 532, Phy Rx 452 is asserted, alerting the time stamp unit 464 that an Ethernet frame is arriving. In one embodiment, Phy Rx 458 is sampled by the time stamp unit 464 of FIG. 4 with a time resolution of 4 nanoseconds. In an alternative embodiment, Phys Rx 458 is sampled by the time stamp unit 464 with a time resolution of 8 nanoseconds.

Figure 6:
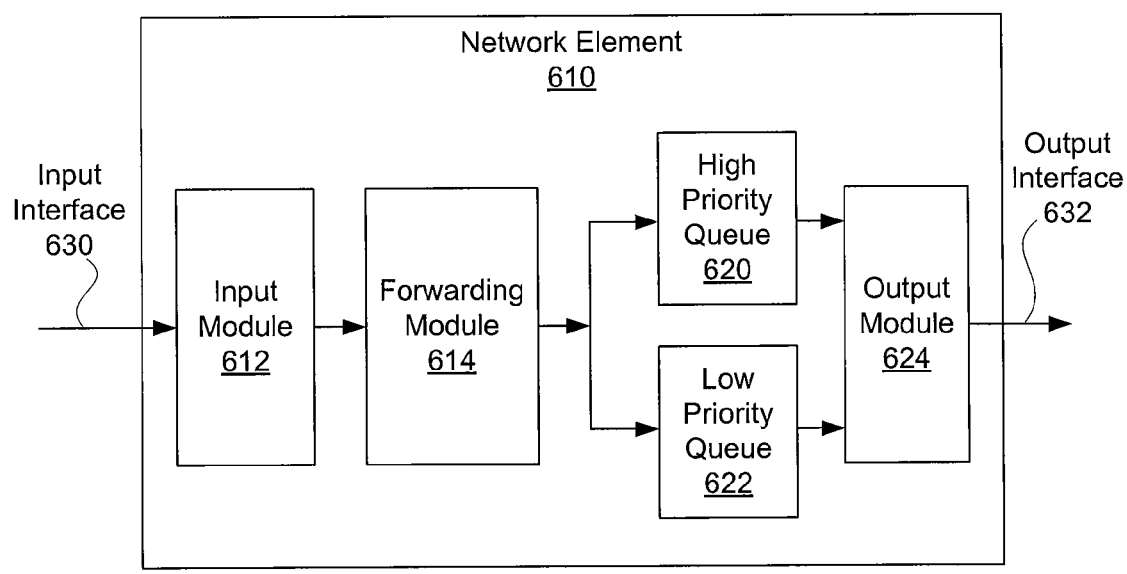
FIG. 6 illustrates a network element disposed within the packet-switched network and configured to process packets according to two different priorities.

FIG. 6 illustrates a network element 610 disposed within the packet-switched network 120 and configured to process packets according to two different priorities. Network element 610 may correspond to any network element 122 within packet-switched network 120. Ingress IP packets are received at input interface 630 and processed by input module 612, which is configured to receive IP packets represented as physical layer signals. Forwarding module 614 designates an output interface, such as output interface 632, for each received IP packet. For example, forwarding module 614 may designate an output interface based on the destination IP address, such as destination IP address 266 of FIG. 2C, for the received IP packet. Each received IP packet may be queued for transmission via output module 624 in either a high priority queue 620 or low priority queue 622. The output module 624 is configured to generate a physical layer signal that represents the IP packet on output interface 632.

An IP packet with a high-priority designation should be stored in high priority queue 620, while an IP packet with a low-priority designation should be stored in the low priority queue 622. Network element 610 operates output module 624 in a normal mode when congestion on output interface 632 is sufficiently low. In normal mode, high priority packets are transmitted to output interface 632 with priority over IP packets stored in the low priority queue 622. However, network element 610 may abruptly switch to a congestion mode when congestion on output interface 632 reaches a certain threshold. In the congestion mode, network element 610 may delay transmission of IP packets stored in the high priority queue 620 and drop IP packets stored in the low priority queue 622. The network element 610 may abruptly switch between normal mode and congestion mode, based on traffic destined to output interface 632.

One consequence of abruptly switching from normal mode to congestion mode is that an IP packet passing through network element 610 is subjected to additional transit delay. Immediately after the network element 610 switches from normal mode to congestion mode, any transit delay measurements, such as transit delay floor measurements, become invalid. If a network element 122 within packet-switched network 120 switches to congestion mode, then IP packets subjected to congestion mode delays should not be used by slave clock 130 for time or frequency alignment, Instead, slave clock 130 should proceed in a holdover mode. In the holdover mode, slave clock 130 relies on NCO 332 of FIG. 3 and a local time clock for local time keeping.

As a way to test whether or not the packet-switched network 120 is operating in the normal mode or the congested mode, the packet interface 320 transmits control packets of a low priority onto the packet-switched network 120 at the same time timing packets of high priority are transmitted onto the packet-switched network 120. If response packets, which are supposed to be issued in "response" to the control packets, are not received by the packet interface 320, it is determined that the packet-switched network 120 is operating in the congested mode, and slave clock 130 operates in the holdover mode. During this holdover mode, the transit delay floor is not estimated and the slave clock 130 is not corrected for "tilt."

Figure 7A:
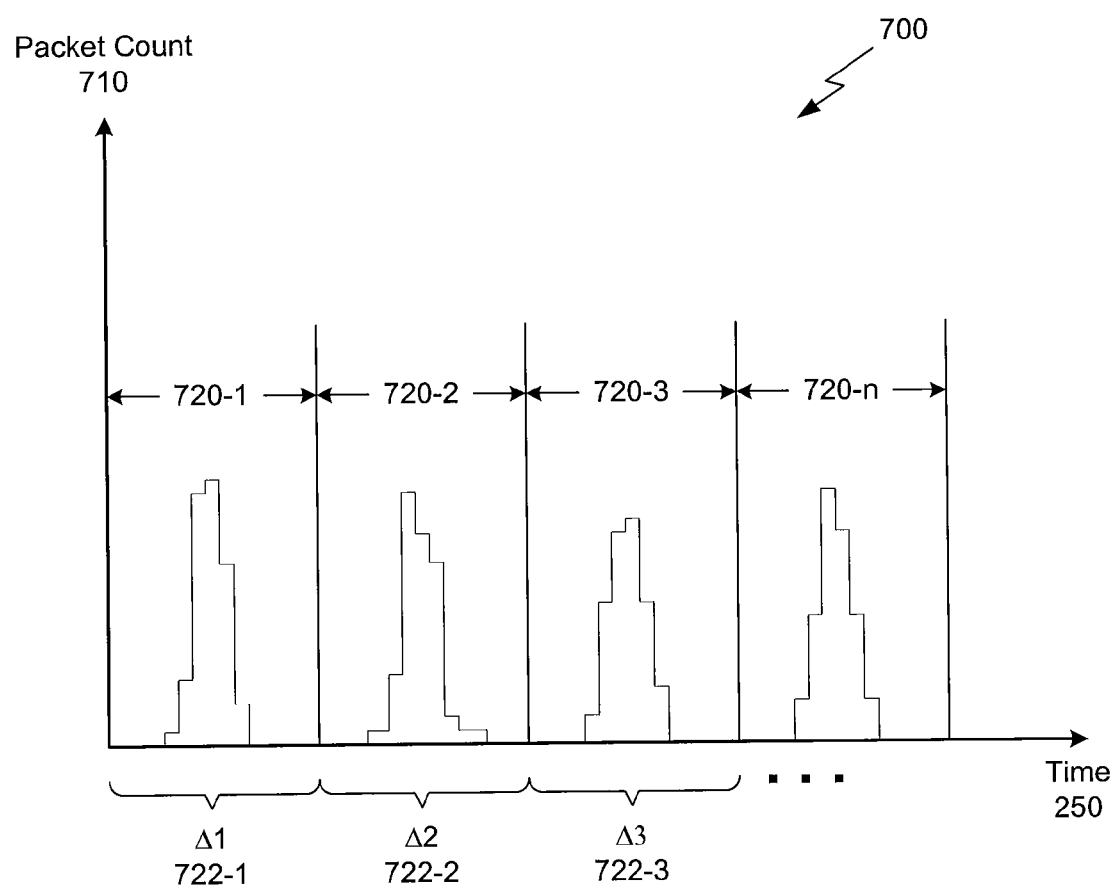
FIG. 7A illustrates a set of periodically generated histograms, each reflecting transit delay times for a corresponding set of packets, according to one embodiment of the invention.

FIG. 7A illustrates a set of periodically generated histograms 700, each reflecting transit delay times for a corresponding set of packets, according to one embodiment of the invention. Each histogram 720 from the set of periodically generated histograms 700 includes a substantially identical number of IP packets, each including a time stamp. A vertical axis represents a packet count 710 for a time interval along time axis 250.

The histograms 720 are generated during substantially fixed time intervals, including Δ1 722-1, Δ2 722-2, and so forth. A given histogram 720 typically includes packets with a distribution of arrival times with respect to a start time for the corresponding interval 722.

Figure 7B:
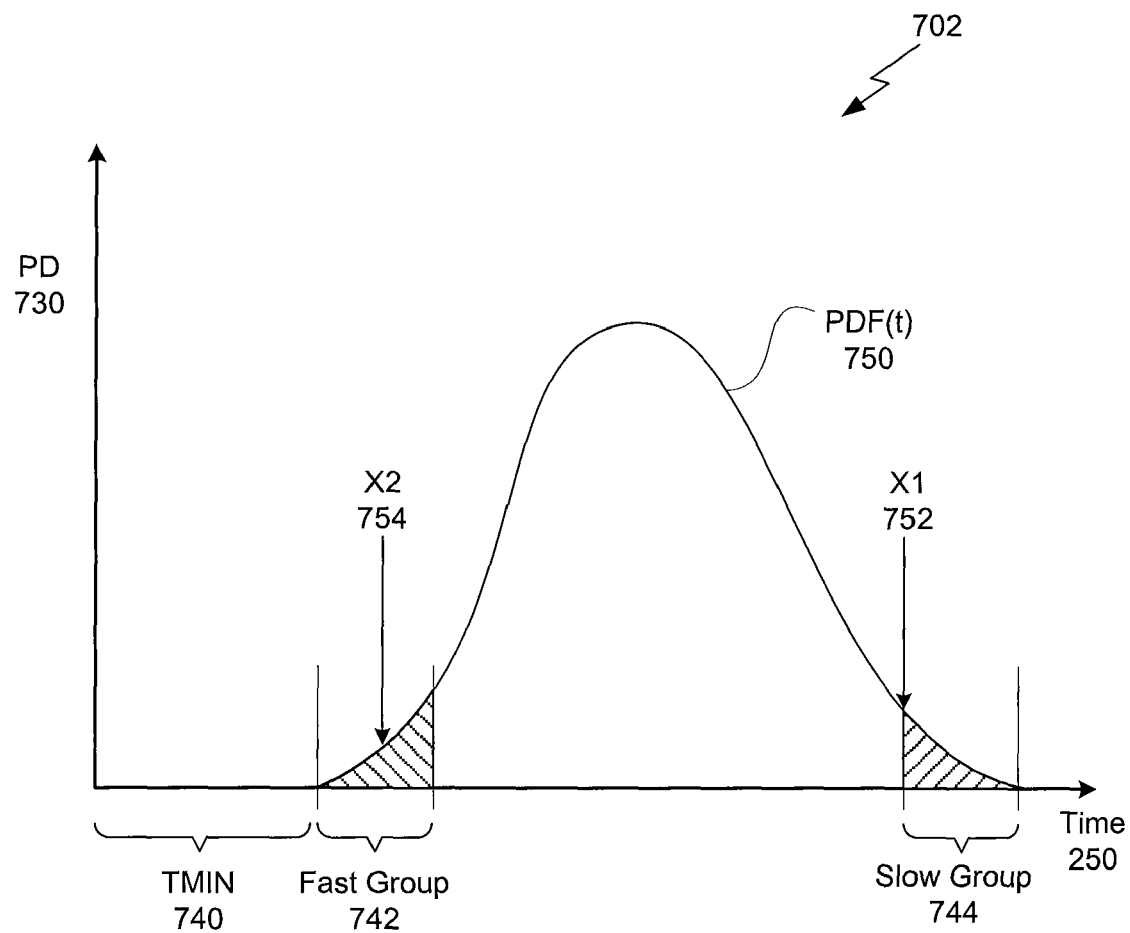
FIG. 7B is a probability density plot illustrating a probability density function organized into three regions, according to one embodiment of the invention.

FIG. 7B is a probability density plot 702 illustrating a probability density function 750 organized into three regions, according to one embodiment of the invention. The first region comprises a fast group 742. In one embodiment, the fast group 742 represents arrival times for the fastest five percent of packets within the corresponding time interval. The second region comprises a slow group 744. In one embodiment, the slow group 744 represents arrival times for the slowest five percent of packets within the corresponding time interval. TMIN 740 represents minimum transit delay latency through packet-switched network 120. PDF 750 represents one histogram 720 of FIG. 7A. A new PDF 750 is generated for each newly generated histogram 720.

Parameter X1 752 represents an arrival time for the one fastest packet within the slow group 744. Parameter X2 754 represents an average of arrival times for the fast group 742. Arrival time may be measured with respect to a start time for a respective time interval. In one embodiment, parameter X2 754 is used as an estimate of the transit delay floor when performing a frequency adjustment of the slave clock 130.

With reference to FIG. 2D, the shape of the pdf (probability density function) curve provides an indication on whether the floor delay (TMIN 276) is well-defined or not. If the pdf has a sharp leading peak as illustrated by PDF 282 in FIG. 2D, the floor is reasonably well defined. If the pdf has a large spread, as illustrated by PDF 284 in FIG. 2D then it is likely that the minimum delay may not be observed if a limited number of packets are examined. However, it is possible to estimate the value of bias by examining the pdf curve. Specifically, the equation provided below can be used to estimate the floor bias. Let the effective probability of the slow group 744 and fast group 742 be equal and equal to α. A typical value for α is 0.015 or 1.5%. The mode width (mw) is equal to the width of the pdf between the fast group 742 and the slow group 744. The minimum delay cluster width (mdcw) is the time delay such that a predetermined fraction of packets will have a delay less than mdcw. A typical choice for this fraction is (64/4096) representing the case where 4096 packets are examined at a time to establish the delay parameters and 64 of these packets have a delay less than mdcw. This value for delay, mdcw, can be used as an estimate (approximation) of the minimum delay. Another approximation for the minimum delay is analogous to X2 754 and represents the minimum delay of the fast group 742 and the floor bias computed by the equation provided below applied as the requisite correction. For the particular choice of parameters [α=0.015 and mdcw fraction=(64/4096)] the appropriate choice of constants are shown in the equation. For other choices of parameters the constants can be optimized in a straightforward manner by curve fitting to experimental data. The key point is that the statistic R=[mdcw/log$_{10}$(mw)] is very highly correlated with the floor bias.

$$\text{floor\_bias} = m \cdot \left[\frac{mdcw}{\log_{10}(mw)}\right] + b \text{ nanoseconds}$$

$$m = 7.44;$$

$$b = 5.7813 \cdot 10^4$$

Figure 8:
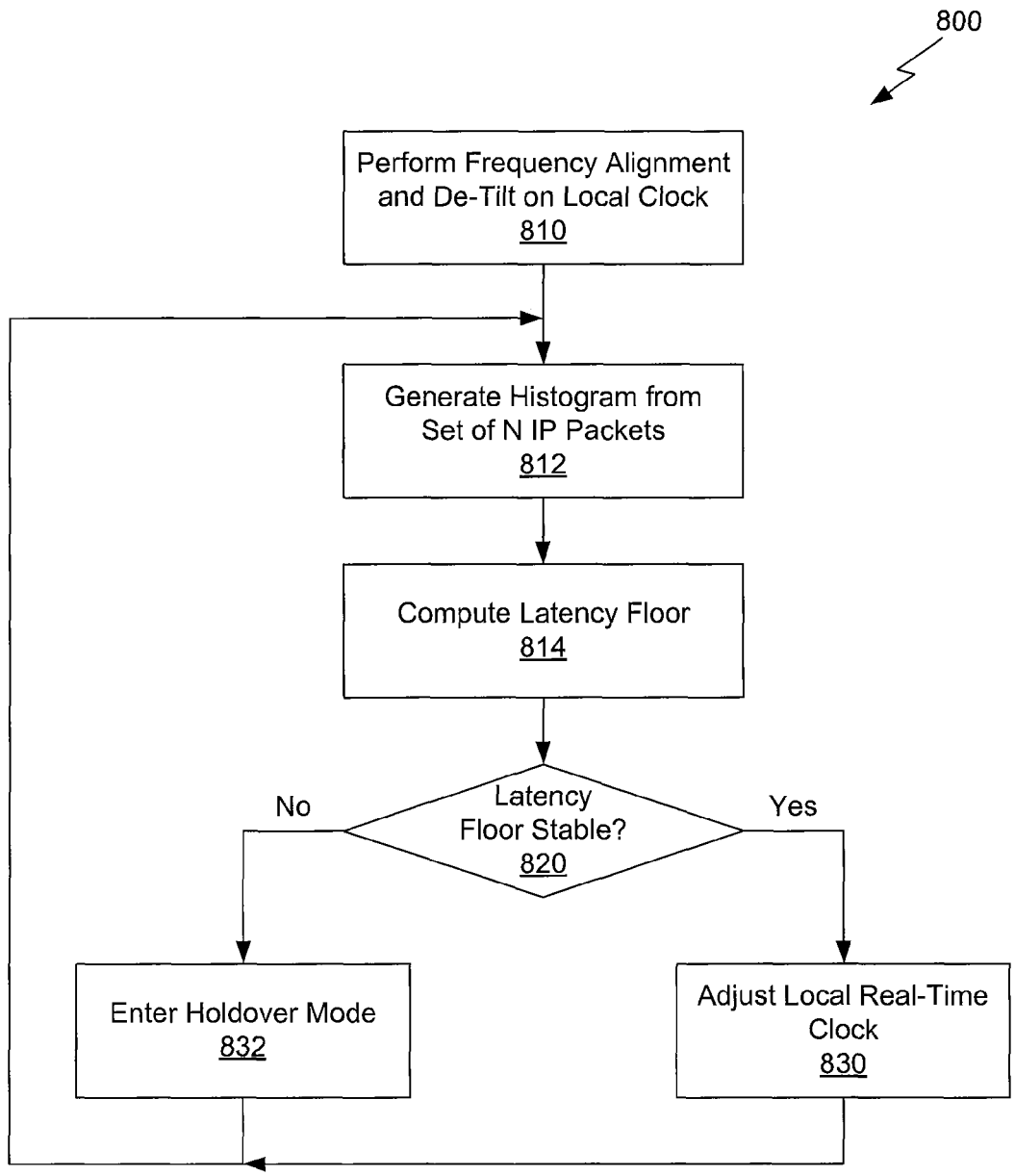
FIG. 8 is a flow diagram of method steps for finding a latency floor in a packet-switched network, according to one embodiment of the invention.

FIG. 8 is a flow diagram of method steps 800 for finding a latency floor in a packet-switched network, according to one embodiment of the invention. Although the method steps are described in conjunction with the systems of FIGS. 1, 3, 4, 5, and 6, persons skilled in the art will understand that any system configured to perform the method steps, in any order, is within the scope of the invention.

The method begins in step 810, where slave clock 130 performs frequency alignment and tilt removal on NCO 332 with respect to master clock 110. Any technically feasible technique may be used to perform frequency alignment and tilt removal.

In step 812, the slave clock 130 generates a histogram from a set of N IP packets. As described in FIG. 7B, a fast group 742 and slow group 744 are identified and parameters X1 752 and X2 754 are computed. In one embodiment N is equal to one hundred. In step 814 slave clock 130 computes a latency floor value for the set of N IP packets based on the technique described in FIG. 7B.

If, in step 820, the latency floor is deemed a stable value (i.e., the packet-switched network 120 is not operating in a normal mode), then the set of N IP packets should be used and the method proceeds to step 830. In step 830 the real-time clock within slave clock 130 is adjusted according to time information within the N IP packets and the computed latency floor. After the real-time clock is adjusted, the method returns to step 810.

Returning to step 820, if the latency floor is deemed to be unstable (i.e., the packet-switched network 120 is operating in a congested mode), then the set of N IP packets should not be used and the method proceeds to step 832. In step 832 the slave clock enters a holdover mode. The slave clock 130 may remain in the holdover mode for a specified amount of time before the method returns to step 810. Alternatively, the method may proceed immediately back to step 810.

While embodiments of the present invention are described in terms of Ethernet technologies, persons skilled in the art will recognize that this invention may be implemented using any technically feasible physical link layer technology without departing the scope of this invention.

One advantage of the disclosed technique is that it enables slave clock systems to tolerate greater latency variation than prior art techniques. Greater tolerance of latency variation is important because latency variation is inevitable in most data networks, and latency variation is a major contributor to inaccuracy in slave clock systems.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method of estimating a latency floor between two nodes of a packet-switched network, comprising the steps of:
   collecting transit times of multiple packets traversing the two nodes;
   determining a probability density function based on the collected transit times; and
   estimating the latency floor using a floor bias correction determined based on a minimum delay cluster width associated with the collected transit times and a width of the probability density function between a fastest N1 percent of the packets and a slowest N2 percent of the packets.

2. The method according to claim 1, wherein N1 is less than 10 and N2 is less than 10.

3. The method according to claim 2, wherein N1 is about 5 and N2 is about 5.

4. The method according to claim 1, wherein the floor bias correction is determined using equation:

$$\text{floor\_bias} = m \cdot \left[ \frac{mdcw}{\log_{10}(mw)} \right] + b \text{ nanoseconds,}$$

mdcw being the minimum delay cluster width, mw being the width of the probability density function between the fastest N1 percent of the packets and the slowest N2 percent of the packets, and m and b being constants.

5. The method according to claim 1, further comprising transmitting packet pairs each including a high priority packet and a low priority packet, wherein the transit time of the high priority packet is collected if the corresponding low priority packet is received and the transit time of the high priority packet is not collected if the corresponding low priority packet is not received.

6. A method of correcting a frequency of a slave clock with respect to a frequency of a master clock, wherein the master clock and the slave clock are located at first and second nodes of a packet-switched network, respectively, said method comprising the steps of:
   (a) transmitting packets from the first node to the second node;
   (b) collecting transit times of multiple of the transmitted packets;
   (c) determining a probability density function based on the collected transit times;
   (d) estimating a latency floor using a floor bias correction determined based on a minimum delay cluster width associated with the collected transit times and a width of the probability density function between a fastest N1 percent of the packets and a slowest N2 percent of the packets; and
   (e) adjusting the frequency of the slave clock based on the estimated latency floor.

7. The method according to claim 6, wherein steps (a) through (d) are repeated after the frequency of the slave clock has been adjusted according to step (e).

8. The method according to claim 6, wherein the transmitted packets include packet pairs each including a high priority packet and a low priority packet, wherein the group of the transmitted packets includes high priority packets whose corresponding low priority packets are received at the second node and does not include high priority packets whose corresponding low priority packets are not received at the second node.

9. The method according to claim 6, wherein the step (d) of estimating includes performing a curve fit to experimental data.

10. The method according to claim 9, wherein the correction is determined using equation:

$$\text{floor\_bias} = m \cdot \left[ \frac{mdcw}{\log_{10}(mw)} \right] + b \text{ nanoseconds,}$$

mdcw being the minimum delay cluster width, mw being the width of the probability density function between the fastest N1 percent of the packets and the slowest N2 percent of the packets, and m and b being constants determined based on the curve fit.

11. The method according to claim 10, wherein N1 is less than 10 and N2 is less than 10.

12. The method according to claim 11, wherein N1 is about 5 and N2 is about 5.

13. A system comprising:
   a packet interface for receiving packets from a master clock system through a packet-switched network;
   a processor programmed to: (i) collect transit times of multiple received packets, (ii) determine a probability density function based on the collected transit times, (iii) estimate a latency floor using a floor bias correction determined based on a minimum delay cluster width associated with the collected transit times and a width of the probability density function between a fastest N1 percent of the packets and a slowest N2 percent of the packets, and (iv) compute frequency adjustment parameters based on the estimated latency floor; and
   an oscillator for generating a clock signal using the frequency adjustment parameters.

14. The system according to claim 13, wherein the packet interface includes hardware time stamp units.

15. The system according to claim 14, wherein the hardware time stamp units include a transmit hardware time stamp unit that compensates for delays through a transmitter media access control unit and a transmit hardware time stamp unit that compensates for delays through a receiver media access control unit.

16. The system according to claim 13, wherein the received packets comprise packet pairs each including a high priority packet and a low priority packet, wherein the group of the received packets includes high priority packets whose corresponding low priority packet is received and does not include high priority packets whose corresponding low priority packet is not received.

17. The system according to claim 13, wherein the processor is further programmed to perform a curve fit to experimental data.

18. The system according to claim 17, wherein the floor bias correction is determined by the processor using equation:

$$\text{floor\_bias} = m \cdot \left[ \frac{mdcw}{\log_{10}(mw)} \right] + b \text{ nanoseconds,}$$

mdcw being the minimum delay cluster width, mw being the width of the probability density function between the fastest N1 percent of the plurality of the packets and the slowest N2 percent of the plurality of the packets, and m and b being constants determined based on the curve fit.

19. The system according to claim 18, wherein N1 is less than 10 and N2 is less than 10.

20. The system according to claim 19, wherein N1 is about 5 and N2 is about 5.

* * * * *